Oct. 29, 1929.  M. ALLAND  1,733,930
BUMPER FOR VEHICLES
Filed Jan. 8, 1929
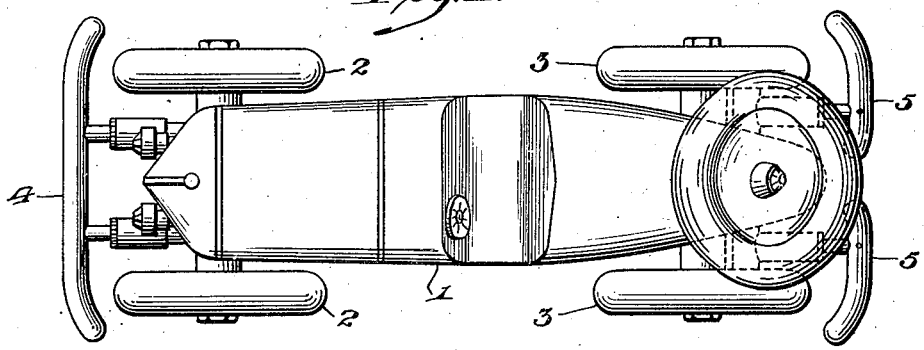
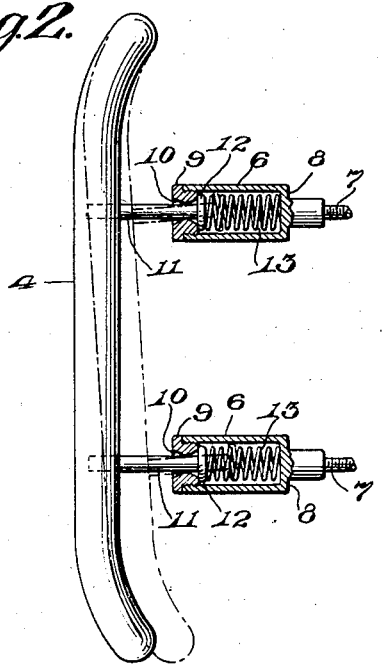
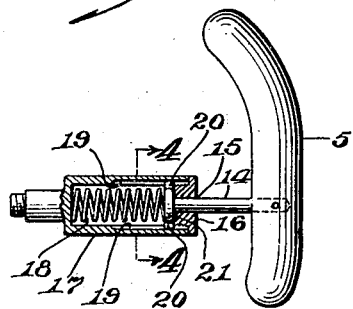
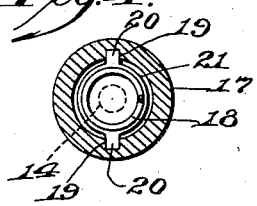
Inventor
Maurice Alland
by J. Stuart Freeman
Attorney
Witness:
Walter Chism.

Patented Oct. 29, 1929

1,733,930

UNITED STATES PATENT OFFICE

MAURICE ALLAND, OF ATLANTIC CITY, NEW JERSEY

BUMPER FOR VEHICLES

Application filed January 8, 1929. Serial No. 331,070.

The object of the invention is to provide improvements in bumpers for vehicles in general, and more particularly in bumpers which are designed for use on automobiles and the like.

Primarily the invention comprises novel methods of mounting such bumpers upon the vehicles, so that the bumper itself can be made of rigid construction, yet efficiently perform its intended function due to the means by which it is yieldingly supported by the vehicle.

A specific object therefore is to provide a longitudinally rigid bumper extending transversely of an automobile, in combination with a plurality of housings, springs within said housings, a closure for each housing having an axial bore which is oppositely bell-mounted, and rods fixed to said bumper and extending through the bores in said closures and cooperating with said springs, whereby said springs normally maintain said rods in extreme outermost position, yet permit an impact upon one end portion of the bumper to cause said end portion to recede independently of the bumper's opposite end portion.

Another object is to provide independently operated smaller bumpers or bumperettes for a portion of the automobile such as the rear, each bumperette comprising a housing, a spring therein, a closure for said housing provided with a bore, a rod extending through said bore and fixedly secured to the bumperette itself, and a head carried by the end of said rod within said housing in contact with the spring and provided with radial projections, slidable within longitudinally extending parallel keyways or grooves in the inner surface of the said housing, said projections preventing the angular movement of the bumperette head, a construction which is unnecessary in the larger bumpers above described as having a plurality of supports.

With these and other objects of construction and operation in mind, the invention comprises further details such as are fully brought out in the following description, when read in conjunction with the accompanying drawings, in which Fig. 1 is a top plan view of a vehicle showing one embodiment of each of the bumpers and bumperettes in operative position thereon; Fig. 2 is an enlarged plan view of the bumper shown in Fig. 1 in both normal (full line) and receded (dot-and-dash line) positions, together with its mountings in cross section; Fig. 3 is an enlarged plan view of one of the bumperettes with its mounting shown in section; and Fig. 4 is an enlarged section on the line 4—4 of Fig. 3.

Referring to the drawings, any representative type of automobile 1 is shown as being provided with forward and rear wheels 2 and 3. The front of the vehicle is protected by a single transversely extending rigid bumper 4, while the latterally opposite portions of the rear of the vehicle are protected by independent, relatively shorter, so-called bumperettes, or small bumpers.

The bumper 4 is operatively mounted upon the vehicle as follows:—A plurality of hollow, preferably cylindrical, housings 6 are secured by any suitable means 7 directly to the vehicle. The inner end 8 of each housing is closed, while the opposite end is normally spanned by a removable closure 9, through which extends a bore 10 which is characterized by the fact that its opposite ends are bell-mouthed.

Fixed to the bumper are as many rods 11 as there are housings, and these rods extend slidably through the bores of said housing closures, while upon their inner ends said rods are provided with heads 12, which are of less diameter than the interior of the surrounding housing. A coil spring 13 or the like within each of said housings extends between the closed end and the head 12 of the adjacent rod 11, and operates to yieldingly maintain said rods in their outermost positions, and to thereby support the bumper in the full-line position shown in Fig. 2.

However, when either end portion of the bumper encounters an object, that end portion is free to yield in accordance with the resiliency of one or both of said springs. If the impact upon the bumper is actually at the end, or closely adjacent to the point of its connection with one of the supporting rods 11, one spring only will yield, the adjacent rod being free to move inwardly and with an angular deflection within its respective housing and closure bore. However, if the impact is between the supporting rods but nearer to one of said rods than to the other, both of said springs will share the strain in proportion to the force, position and direction of the blow, and the resulting recession of the bumper will be represented by such a position as that shown by the dot-and-dash lines in Fig. 2.

The bumperettes 5 are operatively mounted upon the vehicle as follows:—The bumperette is fixed to a rod 14, which passes slidably through a bore 15 in a removable closure 16 covering the outer open end of a housing 17, within which is positioned a suitable spring 18, the inner walls of said housing being provided with parallel grooves 19 in which are slidably positioned wings or offsets 20 of a head 21, secured to the inner end of the said rod 14. An impact upon either of the bumperettes causes the same to recede in a rectilinear direction, and the offsets 20 in engagement with the sides of the grooves 19 serve to prevent the bumperette from shifting its position angularly, and also serve to partially support the weight of the bumperette upon the outer end of the adjacent rod, especially when in their innermost position or adjacent thereto.

Having thus described my invention, what I claim and desire to protect by Letters Patent of the United States is:—

1. The combination of a substantially rigid bumper for automobiles, with a plurality of housings adapted to be fixedly secured to an automobile and each having a closure for one end provided with a bore having bell-mouthed ends, rods fixedly secured to said bumper and extending through the respective bores of said housings, and springs within said housings, said bumper upon receiving an impact upon one end portion being free to shift its longitudinal position angularly while said rods alter their angular positions in said bores.

2. The combination of a substantially rigid bumper for automobiles, with a plurality of housings adapted to be fixedly secured to an automobile and each having an open end normally spanned by a removable closure, in turn having an axial bore which has bell-shaped end portions, springs within said housings, rods fixedly secured to said bumper and extending through said bores, and heads, fixed to the inner ends of said rods, which are of less diameter than the interior of said housings and contact with said springs, an impact upon one end portion of said bumper causing the same to recede independently of the opposite end, by the bumper changing its longitudinal position angularly while the rods alter their angular positions in said bores.

3. A bumper, in combination with a supporting rod, a housing provided with a groove in a side wall, a spring within said housing, a closure for said housing having a bore through which said rod extends, and a head carried by the inner end of said rod in contact with said spring and having an offset extending into said groove, to prevent the rotary movement of said bumper and supporting rod.

In testimony whereof I have affixed my signature.

MAURICE ALLAND.